United States Patent Office 3,520,940
Patented July 21, 1970

3,520,940
PROCESS FOR PREPARING LITHIUM
POLYHYDRIC ALKOXIDES
William Novis Smith, Jr., Exton, Pa., assignor to Foot
Mineral Company, Exton, Pa., a corporation of Pennsylvania
No Drawing. Continuation-in-part of application Ser. No.
616,799, Feb. 17, 1967. This application Dec. 16, 1968,
Ser. No. 784,257
Int. Cl. C07c 31/30, 35/02; C08g 17/06
U.S. Cl. 260—617                                21 Claims

ABSTRACT OF THE DISCLOSURE

A lithium alkoxide of a monohydric alkyl alcohol containing from 2 to 8 carbon atoms is reacted with from about 0.5 to about 1 mole of a polyhydric alcohol in a liquid monohydric alkyl alcohol containing from 2 to 8 carbon atoms or hydrocarbon reaction medium to form the corresponding lithium polyhydric alkoxide as a precipitate which is recovered from the reaction mixture.

---

The present application is a continuation-in-part of copending application Ser. No. 616,799, filed Feb. 17, 1967, now abandoned.

Lithium polyhydric alkoxides are known. For example, lithium ethylene glycoxide is used as a transesterification catalyst in preparing polyester resins from ethylene glycol and the dimethyl ester of terephthalic acid.

Lithium ethylene glycoxide has previously been prepared by adding lithium hydride to excess ethylene glycol and then recovering the excess ethylene glycol. Sodium ethylene glycoxide has been prepared by (1) reaction of sodium hydroxide with excess ethylene glycol and distillation of the resulting water and excess ethylene glycol; (2) reaction of sodium metal with ethylene glycol in liquid ammonia and removal of the ammonia, and (3) reacting sodium metal with excess ethylene glycol and removing the excess glycol [C. F. Cross et al., J. Soc. Chem. Ind., vol. 45, p. 3204 (1926); E. Chablay, Compt. rend., vol. 154, p. 150 (1912), and Belgium Pat. No. 617,696]. Alkali metal alkoxides of polyhydric alcohols can be prepared by reacting alkali metal methoxides or ethoxides with the polyhydric alcohol [Turova et al., Russian Chemical Reviews, pp. 161–178 (March 1965); note also U.S. Pat. No. 2,922,764]. Solutions of sodium-, potassium- and lithium ethylene glycoxides in ethylene glycol have been prepared by adding the solid alkali metal t-butoxide to excess ethylene glycol and distilling off the t-butanol [D. J. Cram et al., J. Am. Chem. Soc., vol. 81, p. 5750 (1959)].

By analogy to procedure (1) above, the reaction between lithium hydroxide and ethylene glycol gives unsatisfactory results. As to procedure (2) above, the use of liquid ammonia is undesirable and is preferably avoided. By analogy to procedure (3), the reaction of lithium metal with excess ethylene glycol is too violent at temperatures at which the reaction would proceed at a favorable rate, near the melting point of lithium. A further objection to the foregoing procedures using large excesses of ethylene glycol lies in the viscous nature of the reaction medium which retards the rate of reaction and in the difficulty in removing and recovering the excess ethylene glycol. However, in the procedures discussed above wherein excess ethylene glycol was used, such excess was believed necessary in order to force equilibrium of the reaction to the alkali metal ethylene glycoxide product. As far as is known, suggested procedures involving reacting an alkali metal alkoxide with a polyhydric alcohol in a solvent reaction medium have resulted in a solution of the desired product requiring laborious separation and recovery procedures.

It is the principal object of the present invention to provide an improved process for preparing lithium polyhydric alkoxides, including, in particular, lithium ethylene glycoxide, whereby the desired lithium polyhydric alkoxide is formed as a precipitate in the reaction medium and thus can be removed and recovered by simply mechnical means.

It is another object of the present invention to provide a process for preparing lithium polyhydric alkoxides wherein only a stoichiometric amount of the polyhydric alcohol is required and wherein the resultnig lithium polyhydric alkoxide can be easily recovered from the reaction mixture in highly pure, solid form and is essentially quantitative yield.

A further object of the present invention is to provide a process for preparing lithium derivatives of a wide variety of polyhydric alcohols wherein relatively low cost volatile solvents are used resulting in simple operation to recover the desired lithium compound.

A specific object of the present invention is to provide an improved method for making monolithium ethylene glycoxide using stoichiometric amounts of lithium and ethylene glycol and wherein the monolithium ethylene glycoxide precipitates from the reaction mixture in essentially quantitative yield.

Other objects will become apparent from a consideration of the following specification and claims.

The process of the present invention for preparing a lithium polyhydric alkoxide comprises reacting a lithium alkoxide of a monohydric alkyl alcohol containing from 2 to 8 carbon atoms with a polyhydric alcohol containing up to 6 hydroxyl groups and from 2 to 18 carbon atoms in a liquid reaction medium selected from the group consisting of monohydric alkyl alcohols containing from 2 to 8 carbon atoms, liquid hydrocarbons containing from 5 to 12 carbon atoms and mixtures thereof, the concentration of said lithium alkoxide in said liquid reaction medium being at least 0.2 molar and the amount of said polyhydric alcohol reacted per mole of said lithium alkoxide being from about 0.5 to about 1 mole thereof, whereby the resulting lithium polyhydric alkoxide precipitates in the reaction medium.

In the preferred embodiment, the lithium alkoxide of the monohydric alkyl alcohol is formed in situ in the liquid reaction medium by reacting 1 mole of lithium or the hydride thereof with 1 mole of the monohydric alkyl alcohol, either in excess monohydric alkyl alcohol or in a liquid hydrocarbon containing from 5 to 12 carbon atoms or in a mixture of excess monohydric alkyl alcohol and liquid hydrocarbon, and the defined polyhydric alcohol is then reacted with the product, in a proportion of from about 0.5 to about 1 mole of polyhydric alcohol per mole of lithium alkoxide.

In most cases, the product lithium polyhydric alkoxide will be a monolithium derivative, that is, one in which only one hydroxyl hydrogen on the polyhydric alcohol is replaced by lithium. In some cases a dilithium derivative can be prepared. For example, with a 1,3 glycol, a monolithium derivative is precipitated in a hydrocarbon solvent but a dilithium derivative is precipitated from a monohydric alkyl alcohol solvent even when sufficient 1,3 glycol is present to form the monolithium derivative. The reaction between the lithium alkoxide and the polyhydric alcohol is believed to be essentially an acid base neutralization, the lithium alkoxide being more basic than the product lithium polyhydric alkoxide. Other factors may also favor the formation of the monolithium derivative; for example, the chelating effect of the presence of other hydroxyl groups on the polyhydric alcohol molecule and the greater insolubility of the lithium derivatives of the polyhydric alcohols as compared to the starting lithium alkoxide of the monohydric alcohol. The formation of the dilithium derivative may be favored if the monolithium derivative is soluble in the reaction medium and the dilithium derivative is relatively insoluble and if the basicity of the first and second hydroxyl groups concerned remains about the same. If the product monolithium derivative is insoluble, it will precipitate from the reaction medium before the dilithium derivative can be formed.

One of the valuable features of the process of the present invention is its applicability to the preparation of lithium derivatives from a wide variety of polyhydric alcohols. As the examples set forth hereinafter will show, the polyhydric alcohol may contain from 2 to 6 hydroxyl groups and up to 18 carbon atoms, and it may be a saturated or unsaturated aliphatic polyhydric alcohol—straight chain, branched chain or cycloaliphatic—or an aromatic polyhydric alcohol. Examples of aliphatic polyhydric alcohols are: ethylene glycol, 1,2-propanediol (propylene glycol), 1,3-propanediol, glycerine, 1,4-butanediol, mannitol, 1,12-dodecanediol, 1,12-octadecanediol, 2,2-dimethyl-1,3-propanediol, 2,5-dimethyl - 2,5 - hexanediol, trimethylolpropane, pentaerythritol, 2,5-dihydroxy-2,5-dimethyl-3-hexyne, and the like. Examples of saturated cycloaliphatic polyhydric alcohols are: 2,2,4,4-tetramethyl-1,3-cyclobutanediol, 1,2-cyclohexanediol, and the like. Examples of aromatic polyhydric alcohols are: resorcinol, 2,2'-dihydroxybiphenyl, and the like. As will be seen from the foregoing, the alcohol groups may be primary, secondary or tertiary or combinations of these. The polyhydric alcohol should be essentially anhydrous.

As stated, in accordance with the process of the present invention, the stated polyhydric alcohol will be reacted with a selected lithium alkoxide of a monohydric alkyl alcohol containing from 2 to 8 carbon atoms in the defined liquid reaction medium. As is well known, such alkoxides may be made by reacting one mole of lithium (or hydride thereof) with one mole of the monohydric alkyl alcohol. Since according to the preferred practice of the present invention, the lithium alkoxide will be prepared in situ in the reaction medium, the alkoxide will be further described in terms of such preparation.

The lithium (or hydride thereof) may be reacted with the monohydric alkyl alcohol in excess alcohol which serves as the reaction medium. In this case bulk lithium may be used. The lithium may also be reacted with the monohydric alkyl alcohol in a hydrocarbon liquid as reaction medium. In this case finely-divided lithium, as in well known dispersion form, is recommended. Such finely-divided lithium may also be used with caution, when excess monohydric alkyl alcohol is the reaction medium. Lithium dispersions, as is known, are prepared by vigorously stirring molten lithium into a liquid hydrocarbon wherein the lithium solidifies as extremely fine particles. The hydrocarbon liquid may then be removed from the lithium to provide a dry dispersion. However, there is no need to remove the hydrocarbon liquid when it is desired to use such hydrocarbon liquid as part or all of the reaction medium in reacting the lithium with the monohydric alkyl alcohol.

The monohydric alkyl alcohol reacted with the lithium (or hydride thereof) will, as stated, contain from 2 to 8 carbon atoms. Examples of such alcohols are: ethyl alcohol, n-propanol, isopropanol, n-butanol, sec-butanol, isobutanol, t-butanol, amyl alcohol, n-octanol, sec-octanol, and the like. As will be seen, the monohydric alkyl alcohol may be straight- or branched chain and it may be primary, secondary or tertiary. The lower alcohols, that is, those containing from 2 to 4 carbon atoms, are preferred for economical reasons and because of the ease with which they may be removed and recovered. Of these, isopropanol and sec-butanol, especially the former, are preferred. The monohydric alcohol should be essentially anhydrous.

The reaction between the lithium (or hydride thereof) with the monohydric alkyl alcohol requires one mole of each to provide the corresponding lithium alkoxide. However, excess monohydric alkyl alcohol may be, and preferably is, used to serve as the reaction medium. The concentration of lithium (or hydride thereof) is preferably such as to provide a concentration of resultant lithium alkoxide of at least 0.2 molar. The concentration may be well above this up to saturation or over. In the event any lithium alkoxide precipitates, additional monohydric alkyl alcohol—or hydrocarbon—may be added prior to the reaction with the polyhydric alcohol. Preferably, however, the concentration of lithium alkoxide will not exceed saturation at reflux temperature. For mixing with the polyhydric alcohol for reaction between that alcohol and the lithium alkoxide, it is preferred that the concentration of lithium alkoxide be from about 1 to about 3 molar.

The reaction between the lithium (or hydride thereof) and the monohydric alkyl alcohol may also take place in a liquid hydrocarbon as the reaction medium. In this case, what has been said above concerning concentration of the resulting lithium alkoxide also applies. The liquid hydrocarbon employed in this embodiment will contain from 5 to 12 carbon atoms and may be saturated aliphatic, like pentane, hexane, octane, decane, dodecane, kerosene, and the like, or aromatic, like benzene, toluene, xylene, and the like. The liquid hydrocarbon will be essentially anhydrous.

If desired, a mixture of such liquid hydrocarbon and excess monohydric alkyl alcohol may be used as the reaction medium in preparing the lithium alkoxide.

The reaction between the lithium (or hydride thereof) and the monohydric alkyl alcohol preferably takes place in an atmosphere substantially free of oxygen, carbon dioxide and moisture, such as under an atmosphere of an inert gas like argon, helium or nitrogen.

The reaction may take place at room temperature. However, it is preferred to carry out the reaction at elevated temperatures, such as at least 50° C., and especially at reflux. Once the lithium (or hydride thereof) has gone into solution and the evolution of hydrogen has creased, the reaction is complete.

The resulting solution, to which additional substantially anhydrous monohydric alkyl alcohol containing from 2 to 8 carbon atoms or liquid hydrocarbon may be added if desired, is then mixed with the selected polyhydric alcohol. While it is preferred to employ a substantially stoichiometric amount of the polyhydric alcohol, that is to say, from about 0.5 to about 1 mole of polyhydric alcohol per mole of lithium alkoxide, depending upon whether the mono- or the dilithium derivative of the polyhydric alcohol is to be recovered, some reasonable excess of polyhydric alcohol, up to 2.5 times the stoichiometric amount, can be used. The preparation of monolithium derivatives is of primary interest and hence the use of about 1 mole of polyhydric alcohol per mole of lithium alkoxide is preferred. Advantageously, the polyhydric alcohol is added to the lithium alkoxide solution with agitation, as by vigorous stirring.

As in the preceding reaction, the reaction between the polyhydric alcohol and the lithium alkoxide preferably takes place under an inert atmosphere, like argon, helium, dry nitrogen and the like. The reaction readily takes place at room temperature or even down to 0° C. However, refluxing is preferred. Reaction is complete, when the consistency of the reaction mixture reaches equilibrium by the cessation of precipitation of the product.

The product lithium polyhydric alkoxide precipitates from the reaction mixture, and this is one of the principal advantageous features of the present process. Precipitated product may readily be removed and recovered by filtration, centrifugation, or the like mechanical means. Any residual liquid reaction medium can be removed from the product, if desired, by drying, advantageously by heating under vacuum which may be preceded by blowing with an inert gas.

In some cases the foregoing reactions can take place in a single stage as by having the polyhydric alcohol, like ethylene glycol, present with the monohydric alcohol, like isopropanol, when the lithium is added thereto, excess monohydric alcohol being used as the reaction medium.

In accordance with the process of the present invention, the combination of (1) lithium alkoxide of a monohydric alkyl alcohol containing 2 to 8 carbon atoms; (2) the defined polyhydric alcohol; (3) a liquid reaction medium which is a monohydric alkyl alcohol containing 2 to 8 carbon atoms and/or a liquid hydrocarbon containing from 5 to 12 carbon atoms, and (4) a concentration of lithium alkoxide in the liquid reaction medium of at least 0.2 molar, is selected as providing the resulting desired lithium polyhydric alkoxide as a precipitate in the reaction mixture. There are preferred conditions which may be observed as favoring more complete precipitation substantially quantitatively. Thus, when the polyhydric alcohol contains only secondary alcohol groups, it is preferred that the monohydric alkyl alcohol of the lithium alkoxide and also any monohydric alkyl alcohol used in the reaction medium be a secondary or tertiary alcohol. In this case, it is also preferred that when the polyhydric alcohol is a cyclic alkane diol, the alcohol groups be in a cis configuration and not in a trans configuration. And when the polyhydric alcohol contains only tertiary alcohol groups it is preferred that the monohydric alkyl alcohol of the lithium alkoxide and also any monohydric alkyl alcohol used in the reaction medium be either a tertiary alcohol or a secondary alcohol and that the polyhydric alcohol have the same order of basicity as that of a secondary monohydric alkyl alcohol having from 2 to 8 carbon atoms. The relative order of basicity of alcohols is well known and is described in, for example, Reaction Mechanisms in Organic Chemistry, by Banthorpe, Elsevier Publishing Co., New York, vol. II, p. 30 (1963) and J.A.C.S., vol. 74, p. 5266 (1952). Generally, the same order of basicity is to be understood as being within a factor of about 2. When the polyhydric contains at least one primary alcohol group, there appears to be no great preference in the nature of the lithium alkoxide or of any monohydric alkyl alcohol used in the reaction medium beyond the economic preference, mentioned above, for monohydric alkyl alcohols containing from 2 to 4 carbon atoms.

The following examples serve to illustrate the process of the invention and are not to be considered as limiting the scope of the invention in any way. (In these examples, the percent yield is based on the lithium (or hydride) and the lithium content was determined by titration with standard acid using phenolphthalein indicator):

EXAMPLE 1

To a solution of lithium isopropoxide in isopropanol, prepared by dissolving 4.7 g. (0.68 mole) of lithium metal in 290 ml. of isopropanol at reflux under argon, was added 421 g. (0.68 mole) of ethylene glycol with vigorous stirring. The resulting thick slurry was stirred at reflux for 30 minutes, cooled to room temperature and filtered. The solid product was blown free of excess solvent with argon and then dried at about 100° C. under a vacuum of 0.5–1 mm. Hg.

The yield was 44.3 g. (97%) of monolithium ethylene glycoxide as a fine, white powder. The lithium content was 10.2%.

EXAMPLE 2

To a solution of lithium isopropoxide prepared by dissolving 3.1 g. (0.39 mole) of lithium hydride in 300 ml. of isopropanol at reflux under argon, was added 24.2 g. (0.39 mole) of ethylene glycol with vigorous stirring. The slurry was refluxed for 30 minutes, cooled to room temperature and filtered. The solid was blown free of excess alcohol with argon and dried under vacuum at about 100° C.

The yield was 24.0 g. (91%) of monolithium ethylene glycoxide having a lithium content of 10.3%.

EXAMPLE 3

To a solution of lithium ethoxide prepared by dissolving 3.5 g. (0.50 mole) of lithium metal in ethanol at reflux under argon, was added 30.4 g. (0.50 mole) of ethylene glycol with vigorous stirring. The slurry was refluxed for 30 minutes, cooled to room temperature and filtered. The solid was blown free of excess alcohol with argon and dried at about 100° C. under a vacuum of 0.5–1 mm. Hg.

The yield was 29.2 g. (88%) of monolithium ethylene glycoxide having a lithium content of 10.1%.

EXAMPLE 4

A dispersion of 6.6 g. (0.95 mole) of lithium in 430 ml. of hexane was brought to reflux and 73 ml. (0.95 mole) of isopropanol was added slowly with stirring at reflux. After the addition of isopropanol was finished, the slurry was refluxed for 2 hours after which 59 g. (0.95 mole) of ethylene glycol was added. The thick slurry was stirred at reflux for 30 minutes, cooled to room temperature and filtered. The solid was blown free of excess hexane and alcohol with argon, and dried at about 100° C. under a vacuum of 0.5–1 mm. Hg.

The yield was 60 g. (93%) of monolithium ethylene glycoxide having a lithium content of 10.2%.

Pentane, heptane or decane, may be substituted for the hexane in this example with essentially equivalent results.

EXAMPLE 5

To a solution of lithium t-butoxide prepared by dissolving 3.0 g. (0.44 mole) of lithium metal in 300 ml. t-butanol at reflux under argon, was added 27.1 g. (0.44 mole) of ethylene glycol with vigorous stirring. The thick slurry was stirred at reflux for 30 minutes and then filtered at 30–40° C. The solid was blown free of excess alcohol with argon and dried at about 100° C. under a vacuum of 0.5–1 mm. Hg.

The yield was 29.9 g. (100%) of monolithium ethylene glycoxide having a lithium content of 10.2%.

EXAMPLE 6

To a solution of lithium isobutoxide prepared by dissolving 2.8 g. (0.41 mole) of lithium metal in 250 ml. of isobutanol at reflux under argon, was added 25.6 g. (0.41 mole) of ethylene glycol with vigorous stirring. The thick slurry was stirred at reflux for 30 minutes, cooled to room temperature and filtered. The solid was blown free of excess alcohol with argon and dried at about 100° C. under a vacuum of 0.5–1 mm. Hg.

The yield was 26.0 g. (93%) of monolithium ethylene glycoxide having a lithium content of 10.2%.

EXAMPLE 7

After dissolving 1.3 g. (0.19 mole) of lithium metal in 250 ml. of sec-butanol under argon, 38.0 g. (0.19 mole) of 1,12-dodecanediol was added at room temperature with vigorous stirring. The thick slurry was stirred at reflux for 30 minutes, cooled to room temperature and filtered. The solid was blown free of excess alcohol with argon and dried at 100° C. under a vacuum of 0.5–1 mm. Hg.

The yield was 30.6 g. (80%) of the monolithium derivative of 1,12-dodecanediol with a lithium content of 3.20%.

EXAMPLE 8

After dissolving 3.12 g. (0.450 mole) of lithium metal in 250 ml. of isopropanol at reflux under argon, 20.3 g. (0.225 mole) of 1,4-butanediol was added with vigorous stirring. The thick slurry was stirred at reflux for one hour cooled to room temperature and filtered. The solid was blown free of excess alcohol with argon and dried at 60–80° C. under a vacuum of 0.5–1 mm. Hg.

The yield was 22 g. (96%) of dilithium derivative of 1,4-butanediol with a lithium content of 13.7%.

EXAMPLE 9

After dissolving 1.0 g. (0.144 mole) of lithium metal in 300 ml. of isopropanol at reflux under argon, 19.5 g. (0.144 mole) of trimethylolpropane was added. The slurry was refluxed 30 minutes, cooled to room temperature and filtered. The solid was blown free of excess alcohol with argon and dried at about 100° C. under a vacuum of 0.5–1 mm. Hg.

The yield was 19.3 g. (95%) of the monolithium derivative of trimethylolpropane having a lithium content of 4.96%.

EXAMPLE 10

After dissolving 2.0 g. (0.29 mole) of lithium metal in 250 ml. of isobutanol at reflux under argon, 30.1 g. (0.29 mole) of 2,2-dimethyl-1,3-propanediol was added. The slurry was cooled to room temperature and the product could be removed by filtration. However, the solvent alcohol was evaporated from the slurry under a vacuum of 0.5–1 mm. Hg.

The yield was 30.5 g. (96%) of the monolithium derivative of 2,2-dimethyl-1,3-propanediol with a lithium content of 6.46%.

EXAMPLE 11

After dissolving 2.5 g. (0.36 mole) of lithium metal in 375 ml. of isopropanol at reflux under argon, 27.5 g. (0.36 mole) of 1,3-propanediol was added with vigorous stirring. The slurry was stirred at reflux for 30 minutes, cooled to room temperature and filtered. The solid was blown free of excess alcohol with argon and dried at about 100° C. under a vacuum of about 0.5–1 mm. Hg.

The yield was 14.2 g. (90%) of dilithium derivative of 1,3-propanediol with a lithium content of 15.7%.

EXAMPLE 12

After dissolving 1.16 g. (0.168 mole) of lithium metal in 250 ml. of isopropanol at reflux under argon, 23.0 g. (0.168 mole) of pentaerythritol was added with vigorous stirring. The thick slurry was stirred at reflux for 3 hours, cooled to room temperature and filtered. The solid was blown free of excess alcohol with argon and dried at about 100° C. under a vacuum of 0.5–1 mm. Hg.

The yield was 23.9 g. (98%) of the monolithium derivative of pentaerythritol having a lithium content of 5.16%.

EXAMPLE 13

To a solution of lithium isopropoxide, prepared by dissolving 2.5 g. (0.37 mole) of lithium metal in 300 ml. of isopropanol at reflux under argon, was added 27.4 g. (0.36 mole) of 1,2-propanediol with vigorous stirring. The thick slurry was stirred at reflux for 30 minutes, cooled to room temperature and filtered. The solid was blown free of excess alcohol with argon and dried at about 100° C. under a vacuum of 0.5–1 mm. Hg.

The yield was 26.0 g. (89%) of the monolithium derivative of 1,2-propanediol with a lithium content of 8.6%.

EXAMPLE 14

A dispersion of 2.75 g. (0.40 mole) of lithium in 250 ml. of hexane is brought to reflux and 32 ml. (0.41 mole) of isopropanol was added slowly at reflux with stirring. The slurry was refluxed for 2 hours after the addition was finished and then 36.0 g. (0.40 mole) of 1,4-butanediol was added. The slurry was stirred for 30 minutes at reflux, cooled to room temperature and filtered. The solid was blown free of excess hexane and alcohol with argon and dried at room temperature under a vacuum of 0.5–1 mm. Hg.

The yield was 36.0 g. (95%) of monolithium derivative of 1,4-butanediol with a lithium content of 6.91%.

Benzene, toluene or xylene may be substituted for the hexane with comparable results.

EXAMPLE 15

To a solution of lithium sec-butoxide, prepared by dissolving 2.0 g. (0.29 mole) of lithium metal in 250 ml. of sec-butanol at reflux under argon, was added 27.4 g. (0.30 mole) of glycerine with vigorous stirring. The thick slurry was refluxed 1 hour, cooled to 40° C. and filtered. The solid was blown free of excess alcohol with argon and dried below 50° C. under a vacuum of 0.5–1 mm. Hg.

The yield was 26.8 g. (95%) of monolithium glyceroxide with a lithium content of 7.12%.

EXAMPLE 16

After dissolving 2.0 g. (0.288 mole) of lithium metal in 250 ml. of isopropanol at reflux under argon, 33.5 g. (0.288 mole) of 1,2-cyclohexanediol was added. A heavy white precipitate formed, and the slurry was heated at reflux for an additional 10 minutes and cooled to room temperature. The product could be removed by filtration. However, the alcohol was removed from the slurry on a rotary film evaporator.

The yield was 28.5 g. (96%) of the monolithium derivative of 1,2-cyclohexanediol with a lithium content of 5.64%.

EXAMPLE 17

After dissolving 1.98 g. (0.285 mole) of lithium metal in 300 ml. of n-octanol at 120° C., 17.7 g. (0.285 mole) of ethylene glycol was added. The resulting slurry was filtered and the residue dried.

The yield was 18.2 g. (94%) of lithium ethylene glycoxide with a lithium content of 10.31%.

EXAMPLE 18

After dissolving 18.5 g. (0.267 mole) of lithium metal in 500 ml. of isopropanol, 85.8 g. (0.267 mole) of 1,12-octadecanediol was added. The slurry was refluxed for 1 hour, cooled to room temperature and filtered.

The yield was 73 g. (84%) of the monolithium derivative of 1,12-octadecanediol with a lithium content of 2.64%.

EXAMPLE 19

To a solution of lithium isopropoxide, prepared by dissolving 1.4 g. of lithium metal in 250 ml. of isopropanol at reflux under argon, was added 36.7 g. of mannitol. The slurry was heated at reflux under argon for 1 hour, cooled to room temperature and filtered. The solid was dried at 100° C. under a vacuum of 0.5–1 mm. Hg.

The yield was 40 g. of the monolithium derivative of mannitol having a lithium content of 3.21%.

EXAMPLE 20

After dissolving 1.05 g. of lithium metal in 400 ml. of sec-butanol at reflux under argon, 21.5 g. of 2,5-dihydroxy-2,5-dimethyl-3-hexyne was added. The mixture, after it was stirred for 15 minutes at about 80° C., was cooled to room temperature and filtered. The solid was dried at 40° C. under a vacuum of 0.5-1 mm. Hg.

The yield was 19 g. of the monolithium derivative of 2,5-dihydroxy-2,5-dimethyl-3-hexyne having a lithium content of 4.95%.

EXAMPLE 21

After dissolving 2 g. of lithium metal in 280 ml. of isopropanol at reflux under argon, 53.7 g. of 2,2'-dihydroxybiphenyl was added. The mixture, after it was refluxed for 15 minutes, was cooled to room temperature and filtered. The solid was 39 g. of the monolithium derivative of 2,2'-dihydroxybiphenyl.

EXAMPLE 22

After dissolving 1.4 g. of lithium metal in 250 ml. of t-butanol at reflux under argon, 74.1 g. of benzopinacol was added. The mixture, after refluxing for 15 minutes, was cooled to room temperature and filtered. The solid was 46 g. of the monolithium derivative of benzopinacol.

EXAMPLE 23

After dissolving 1.12 g. of lithium metal in 200 ml. of t-butanol at reflux under argon, 19 g. of 1,2-cyclohexane diol was added. The mixture, after refluxing for 15 minutes, was cooled to room temperature and filtered. The solid was 16 g. of the monolithium derivative of 1,2-cyclohexane diol.

EXAMPLE 24

After dissolving 3.25 g. of lithium metal in 200 ml. of ethanol at reflux under argon, 52 g. of catechol was added. The mixture, after refluxing for 15 minutes, was cooled to room temperature and filtered. The solid was 54 g. of the monolithium derivative of catechol.

By way of comparison, the following examples illustrate the differences between lithium, on the one hand, and sodium and potassium, on the other, and also the differences between methanol and higher monohydric alkyl alcohols:

EXAMPLE 25

After dissolving 12.1 g. (0.31 mole) of potassium metal in 250 ml. of isopropanol at 35° C., the solution was heated to 60° C. and 19.5 g. (0.31 mole) of ethylene glycol was added. The solution was cooled to and, no precipitation having occurred, the solution was evaporated to dryness under vacuum to provide, after drying the resulting solid at about 100° C. under vacuum, 32 g. of monopotassium ethylene glycoxide with a potassium content of 38.4%.

EXAMPLE 26

To a 25%, by weight, solution of sodium methoxide in methanol containing 122.2 g. (0.57 mole) of sodium methoxide was added 35.1 g. (0.57 mole) of ethylene glycol under argon at room temperature. No precipitate formed, and the solution was evaporated to dryness at room temperature under a vacuum of 0.5–1 mm. Hg to provide, after drying the resulting solid under vacuum at about 100° C., 46.5 g. of monosodium ethylene glycoxide with a sodium content of 27.3%.

EXAMPLE 27

To a 10.4%, by weight, solution of lithium methoxide in methanol containing 154 g. (0.42 mole) of lithium methoxide was added 26.1 g. (0.42 mole) of ethylene glycol under argon at room temperature. No precipitate formed, and the resulting solution was evaporated to dryness at room temperature under a vacuum of 0.5–1 mm. Hg to provide, after drying the resulting solid under vacuum at about 100° C., 27.4 g. of monolithium ethylene glycoxide with a lithium content of 10.3%.

EXAMPLE 28

To 70.9 g. of a 10.2%, by weight, solution of lithium methoxide in methanol was added 35.5 g. of 2,2'-dihydroxybiphenyl at room temperature under argon. No precipitate formed, and the solution was evaporated to dryness, under argon, under a vacuum of 0.5–1 mm. Hg at 80° C. to provide 36 g. of the monolithium derivative of 2,2'-dihydroxybiphenyl with a lithium content of 3.54%.

EXAMPLE 29

To 187 ml. of a 10.2%, by weight, solution of lithium methoxide in methanol was added 47.2 g. of resorcinol under argon at room temperature. No precipitate formed, and the solution, under argon, was evaporated to dryness under a vacuum of 0.5–1 mm. Hg at 80° C. to provide 50.5 g. of the monolithium derivative of resorcinol with a lithium content of 5.88%.

Modification is possible in the selection of monohydric alkyl alcohol and polyhydric alcohol as well as in procedural techniques and conditions, without departing from the scope of the invention.

What is claimed is:

1. The process for preparing a lithium polyhydric alkoxide which comprises reacting a lithium alkoxide of an alkanol containing from 2 to 8 carbon atoms with a polyhydric alcohol containing up to 6 hydroxyl groups and from 2 to 18 carbon atoms free of substituents, other than hydroxyl groups, and selected from the group consisting of (1) straight chain aliphatic polyhydric alcohols, (2) branched chain aliphatic polyhydric alcohols, and (3) cycloaliphatic 1,2 diols, in a liquid reaction medium selected from the group consisting of alkanols containing from 2 to 8 carbon atoms, liquid hydrocarbons containing from 5 to 12 carbon atoms and mixtures thereof, the concentration of said lithium alkoxide in said liquid reaction medium being at least 0.2 molar and the amount of said polyhydric alcohol reacted per mole of said lithium alkoxide being from about 0.5 to about 1 mole thereof, said reaction occurring under a substantially inert atmosphere, under essentially anhydrous conditions, and, at a temperature ranging from about 0° C. to reflux, whereby the resulting lithium polyhydric alkoxide precipitates from the reaction mixture.

2. The process of claim 1 wherein said lithium alkoxide is a lithium alkoxide of an alkanol containing from 2 to 4 carbon atoms.

3. The process of claim 2 wherein said liquid reaction medium is an alkanol containing from 2 to 4 carbon atoms.

4. The process of claim 1 wherein said lithium alkoxide is lithium isopropoxide, and wherein said liquid reaction medium is isopropanol.

5. The process of claim 1 wherein said polyhydric alcohol is ethylene glycol, and wherein the mol ratio of lithium alkoxide to ethylene glycol in the reaction mixture is about 1:1.

6. The process of claim 1 wherein said lithium alkoxide is a lithium alkoxide of an alkanol containing from 2 to 4 carbon atoms; wherein said liquid reaction medium is an alkanol containing from 2 to 4 carbon atoms; wherein the polyhydric alcohol is ethylene glycol, and wherein the molar ratio of lithium alkoxide to ethylene glycol in the reaction mixture is about 1:1.

7. The process of claim 6 wherein the concentration of said lithium alkoxide in said liquid reaction medium is from about 1 to about 3 molar.

8. The process of claim 1 wherein said polyhydric alcohol contains at least one primary alcohol group.

9. The process of claim 8 wherein said lithium alkoxide is a lithium alkoxide of an alkanol containing from 2 to 4 carbon atoms, and wherein said liquid reaction medium is an alkanol containing from 2 to 4 carbon atoms.

10. The process of claim 1 wherein said polyhydric alcohol contains only secondary alcohol groups, and wherein said alkanol is selected from the group consisting of secondary and tertiary monohydric alkyl alcohols.

11. The process of claim 10 wherein the polyhydric alcohol is a cyclic alkane diol, and wherein the alcohol groups of the cyclic alkane diol are in a cis configuration.

12. The process of claim 11 wherein said alkanol contions from 2 to 4 carbon atoms.

13. The process for preparing a lithium polyhydric alkoxide which comprises reacting 1 mole of lithium or lithium hydride with 1 mole of alkanol having from 2 to 8 carbon atoms under a substantially inert atmosphere and under essentially anhydrous conditions, in a liquid reaction medium selected from the group consisting of excess alkanol, liquid hydrocarbons containing from 5 to 12 carbon atoms and mixtures thereof to form the corresponding lithium alkoxide in said liquid reaction medium; thereafter reacting, under a substantially inert atmosphere, under essentially anhydrous conditions, and at a temperature ranging from about 0° C. to reflux, in said liquid reaction medium in which the concentration of said lithium alkoxide is at least 0.2 molar, said lithium alkoxide with a polyhydric alcohol containing up to 6 hydroxyl groups and from 2 to 18 carbon atoms free of substituents, other than hydroxyl groups, and selected from the group consisting of (1) straight chain aliphatic polyhydric alcohols, (2) branched chain aliphatic polyhydric alcohols, and (3) cycloaliphatic 1,2 diols, the amount of said polyhydric alcohol reacted per mole of lithium alkoxide being from about 0.5 to about 1 mole thereof, whereby the resulting lithium polyhydric alkoxide precipitates from the reaction mixture.

14. The process of claim 13 wherein said alkanol contains from 2 to 4 carbon atoms.

15. The process of claim 14 wherein said alkanol is isopropanol.

16. The process of claim 13 wherein said polyhydric alcohol is ethylene glycol, and wherein the mol ratio of lithium alkoxide to ethylene glycol in the reaction mixture is about 1:1.

17. The process of claim 13 wherein said lithium alkoxide is a lithium alkoxide of an alkanol containing from 2 to 4 carbon atoms; wherein said liquid reaction medium is an alkanol containing from 2 to 4 carbon atoms; wherein the polyhydric alcohol is ethylene glycol, and wherein the molar ratio of lithium alkoxide to ethylene glycol in the reaction medium is about 1:1.

18. The process of claim 17 wherein the concentration of said lithium alkoxide in said liquid reaction medium is from about 1 to about 3 molar.

19. The process of claim 13 wherein said polyhydric alcohol contains at least one primary alcohol group.

20. The process of claim 19 wherein said alkanol contains from 2 to 4 carbon atoms.

21. The process of claim 13 wherein said polyhydric alcohol contains only secondary alcohol groups, and wherein said alkanol is selected from the group consisting of secondary and tertiary monohydric alkyl alcohols.

References Cited

UNITED STATES PATENTS

| | | |
|---|---|---|
| 2,069,404 | 2/1937 | Cunningham. |
| 2,267,733 | 12/1941 | Hansley. |
| 2,368,880 | 2/1945 | Reiff et al. |
| 2,922,764 | 1/1960 | Boswell et al. |
| 2,965,663 | 12/1960 | Smith et al. |
| 3,100,750 | 8/1963 | Bailey et al. |
| 3,190,906 | 6/1965 | Mueller et al. |

FOREIGN PATENTS

| | | |
|---|---|---|
| 727,923 | 4/1955 | Great Britain. |

OTHER REFERENCES

Lithaloys, A product bulletin received March 1946.
Lithium Corp., "Ind. & Eng. Chem." (1963).
Cram et al., "J. Am. Chem. Soc.," vol. 81 (1959), pp. 5750 to 5754.
Turora et al., "Russian Chemical Reviews," (March 1965), pp. 161 to 170, 176 to 178.

BERNARD HELFIN, Primary Examiner

J. E. EVANS, Assistant Examiner

U.S. Cl. X.R.

260—618, 620, 621, 631, 632, 635

UNITED STATES PATENT OFFICE
CERTIFICATE OF CORRECTION

Patent No. 3,520,940                          July 21, 1970

William Novis Smith, Jr.

It is certified that error appears in the above identified patent and that said Letters Patent are hereby corrected as shown below:

In the heading to the printed specification, lines and 3, "Foot Mineral Company" should read -- Foote Mineral Company --.

Signed and sealed this 23rd day of February 1971.

(SEAL)
Attest:

Edward M. Fletcher, Jr.
Attesting Officer

WILLIAM E. SCHUYLER, JR.
Commissioner of Patents